(12) United States Patent
Jaw

(10) Patent No.: US 6,871,160 B2
(45) Date of Patent: Mar. 22, 2005

(54) INTELLIGENT CONDITION-BASED ENGINE/EQUIPMENT MANAGEMENT SYSTEM

(75) Inventor: Link C. Jaw, Scottsdale, AZ (US)

(73) Assignee: Scientific Monitoring Inc., Scottsdale, AZ (US)

( * ) Notice: Subject to any disclaimer, the term of this patent is extended or adjusted under 35 U.S.C. 154(b) by 43 days.

(21) Appl. No.: 10/237,407

(22) Filed: Sep. 5, 2002

(65) Prior Publication Data

US 2003/0120402 A1 Jun. 26, 2003

Related U.S. Application Data

(60) Provisional application No. 60/317,757, filed on Sep. 8, 2001.

(51) Int. Cl.$^7$ .............................................. G06F 19/00
(52) U.S. Cl. ........................ 702/182; 702/184; 700/108
(58) Field of Search ................................ 702/182, 183, 702/184, 185, 33, 34, 35, 36; 700/108; 701/29, 30

(56) References Cited

U.S. PATENT DOCUMENTS

| | | | | |
|---|---|---|---|---|
| 6,006,171 A | * | 12/1999 | Vines et al. ................ | 702/184 |
| 6,141,629 A | * | 10/2000 | Yamamoto et al. ......... | 702/187 |
| 6,192,325 B1 | * | 2/2001 | Piety et al. ................. | 702/184 |
| 6,343,236 B1 | * | 1/2002 | Gibson et al. ............... | 700/79 |
| 6,401,056 B1 | * | 6/2002 | Sirois ......................... | 702/184 |
| 6,408,258 B1 | * | 6/2002 | Richer ........................ | 702/182 |
| 6,442,511 B1 | * | 8/2002 | Sarangapani et al. ....... | 702/194 |
| 6,490,543 B1 | * | 12/2002 | Jaw ............................ | 702/184 |
| 6,571,158 B2 | * | 5/2003 | Sinex ......................... | 701/29 |
| 6,671,593 B2 | * | 12/2003 | Sinex ......................... | 701/29 |
| 6,684,349 B2 | * | 1/2004 | Gullo et al. ................. | 714/47 |
| 6,691,064 B2 | * | 2/2004 | Vroman ...................... | 702/183 |
| 2001/0032103 A1 | * | 10/2001 | Sinex ............................. | 705/4 |
| 2002/0022984 A1 | * | 2/2002 | Daniel et al. ................... | 705/8 |
| 2002/0049563 A1 | * | 4/2002 | Vetter et al. ................. | 702/184 |
| 2002/0059269 A1 | * | 5/2002 | McQuown et al. .......... | 707/100 |
| 2002/0059270 A1 | * | 5/2002 | Schlabach et al. .......... | 707/100 |
| 2002/0065698 A1 | * | 5/2002 | Schick et al. ................... | 705/8 |
| 2002/0183866 A1 | * | 12/2002 | Dean et al. ................... | 700/26 |
| 2003/0004679 A1 | * | 1/2003 | Tryon et al. ................. | 702/182 |
| 2003/0055666 A1 | * | 3/2003 | Roddy et al. ................... | 705/1 |
| 2003/0149548 A1 | * | 8/2003 | Mosses et al. .............. | 702/184 |
| 2003/0200055 A1 | * | 10/2003 | Butler et al. ................ | 702/183 |

* cited by examiner

Primary Examiner—Patrick Assouad
(74) Attorney, Agent, or Firm—The Halvorson Law Firm

(57) ABSTRACT

Health management of machines, such as gas turbine engines and industrial equipment, offers the potential benefits of efficient operations and reduced cost of ownership. Machine health management goes beyond monitoring operating conditions, it assimilates available information and makes the most favorable decisions to maximize the value of the machine. These decisions are usually related to predicted failure modes and their corresponding failure time, recommended corrective actions, repair/maintenance actions, and planning and scheduling options. Hence machine health management provides a number of functions that are interconnected and cooperative to form a comprehensive health management system. While these interconnected functions may have different names (or terminology) in different industries, an effective health management system should include four primary functions: sensory input processing, fault identification, failure/life prediction, planning and scheduling. These four functions form the foundation of the method of ICEMS (Intelligent Condition-based Engine/Equipment Management System). To facilitate information processing and decision making, these four functions may be repartitioned and regrouped, such as for network based computer software designed for health management of sophisticated machinery.

4 Claims, 10 Drawing Sheets

INTELLIGENT CONDITION-BASED ENGINE/EQUIPMENT MANAGEMENT SYSTEM

This application is a continuation of pending application Ser. No. 60/317,757 filed on Sep. 8, 2001.

FIELD OF THE INVENTION

The present invention relates to a machine health management system.

BACKGROUND

Health management is a modem phrase in the industry for engine and/or equipment condition monitoring and maintenance planning, especially in the aerospace industry. In a historical perspective, Condition Monitoring System (CMS) is a generally accepted term for a ground-based (remote) or an on-board system (local) that performs some level of condition monitoring and health management. The scope of a CMS typically includes failure alert, detection, and isolation. Maintenance planning is performed by some ground-based systems and is mostly concerned with scheduled inspections and time-based repairs, or On-Condition Maintenance (OCM), i.e., a part is replaced only for cause.

With the recently emphasis on Reliability-Centered Maintenance (RCM), the goal of health management has been focused on implementing a systematic process of determining the maintenance requirements of a physical asset, which may be an entire piece of equipment such as an engine or a single part of the equipment/engine, to ensure its readiness, performance, and operability. To determine maintenance requirements effectively, the identification of failures and the prediction of failure progressions are essential; hence the Prognostics and Health Management (PHM) philosophy has also been emphasized recently in industries such as the aerospace industry. The various functions of health management are illustrated in FIG. 1.

The purpose of equipment health management is to realize significant benefits in operations planning and reduced cost of ownership. To realize these benefits, the various health management functions, as illustrated in FIG. 1, must be efficiently integrated and timely updated with new information. Since 1985, the U.S. Air Force has been using a computer program to facilitate engine health management. This program, known as the Comprehensive Engine Trending and Diagnostic System (CETADS), incorporates graphical user interface based software to help the Air Force perform data trending and diagnostic functions for its engine fleets. As the primary tool for data-driven engine health management CETADS has many limitations that have prevented it from realizing the full potential benefits of health management. Among these limitations are:

The program has too low an automation level. The program needs a higher level of automation among its analytical functions. This need increases as staffing and training levels both decrease.

The program incorporates low level algorithms having data limitations on certain engine models. The program needs to incorporate more advanced algorithms to overcome data limitations on certain engine models.

The program has poor mid- to long-range planning capabilities. The program needs to improve the mid- to long-range planning capability to help flight operations. An example of CETADS' trending limitation is described as follows: Engine data obtained during take-off are compared to data collected from previous flights. Theoretically, a trend in this take-off data can be identified, and if this trend reaches a pre-set threshold, then a corresponding failure condition (or failure mode) can be inferred or signaled. Currently, the data trending functionality is compromised by data inconsistency due to the variation in flight conditions when the data are collected, and due to instrumentation uncertainties; consequently, false alarms and missed detections have reduced the credibility of CETADS' trending.

Another example of CETADS' limitations is mid- to long-range planning to help flight operations. Aside from scheduling routine repair/replacement of time/cycle-limited parts, CETADS provides little maintenance planning capability based on engine readiness or cost objective.

Thus, there is an increasing need for improved machinery and/or equipment health management and methods for accomplishing the same. This need for effective monitoring of machinery/condition and efficient maintenance planning is present for other industries as well.

SUMMARY OF INVENTION

The present invention is embodied in methods for The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION OF PREFERRED EMBODIMENTS

Health management is a modem phrase for condition monitoring and maintenance planning. In a historical perspective, Condition Monitoring System (CMS) is a generally accepted term for a ground-based or an on-board system that performs some level of condition monitoring and health management. The scope of a CMS typically includes failure alert, detection, and isolation. Maintenance planning is performed by some ground-based systems and is mostly concerned with scheduled inspections and time-based repairs, or On-condition Maintenance (OCM), i.e., a part is replaced only for cause.

With the recent emphasis on Reliability-Centered Maintenance (RCM), the goal of health management has been focused on implementing a systematic process of determining the maintenance requirements of a physical asset to ensure its readiness, performance, and operability.

Figure 1:
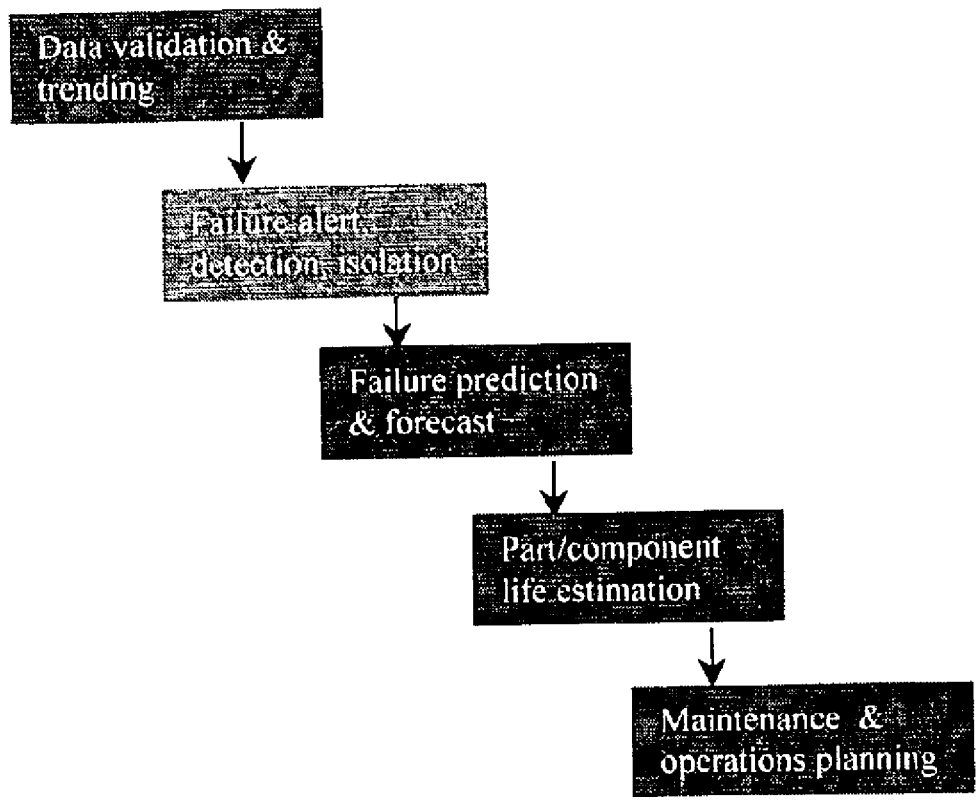
FIG. 1 shows various functions of health management.

The purpose of health management is to realize significant benefits in operations planning and reduced cost of ownership. To realize these benefits, the various health management functions must be efficiently integrated and timely updated with new information. These various functions are illustrated in FIG. 1.

Thus, the present invention is concerned with algorithms that perform condition monitoring and maintenance planning. The algorithms can function independently or can be integrated together to form a comprehensive condition monitoring and maintenance management system, called ICEMS (Intelligent Condition-Based Engine/Equipment Management System).

Figure 2:
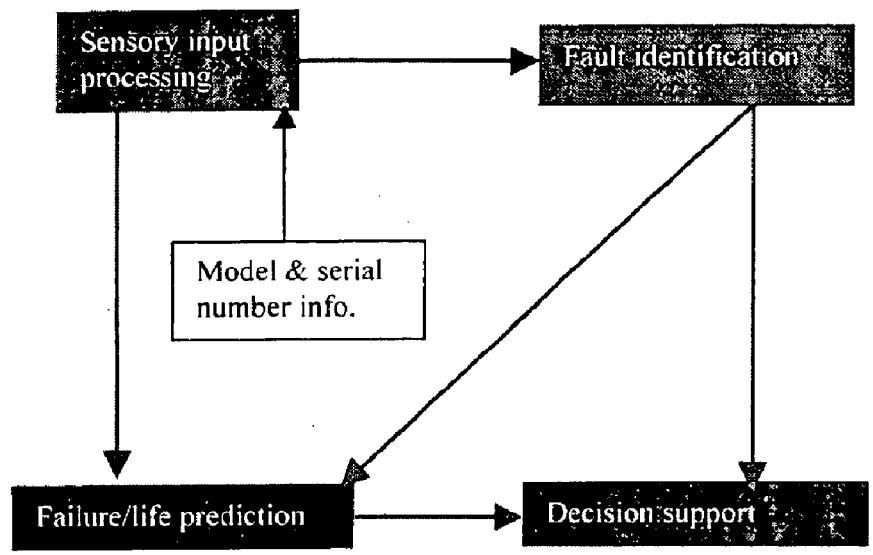
FIG. 2 outlines the Intelligent Condition-based Equipment Health Management System (ICEMS), according to the present invention.

FIG. 2 illustrates the primary functions of an Intelligent Condition-Based Engine/Equipment Health Management System (ICEMS) according to the present invention. As can be seen from FIG. 2, the ICEMS method includes four primary health management functions:

Sensory input processing

Fault identification (a fault is an abnormality whether known, unknown, or uncategorized)

Failure and life prediction (a failure is an actual breakdown of functionality or a violation of safe operating condition)

Maintenance decision support (planning and scheduling)

These functions are described in more detail below.

Sensory Input Processing

Various sensors are attached to equipment or engines that are to be monitored. Measurements (measured data) from these sensors are collected and converted into engineering units, the data are then filtered and smoothed to validate the inputs and remove the noise from the signal. These initial steps are considered sensory input processing and the result is higher-quality information about the actual operating condition of the physical system being measured. After the sensory input data are processed, these data can be used with confidence in other health management functions.

Fault Identification

Fault identification is concerned with the detection and isolation of faults. A fault can be the abnormality that has "grown" to the extent beyond a safe operating limit, or it can be a developing abnormality that has not yet reached a predetermined safety limit. In either case a predetermined threshold or a class boundary is assumed which categorizes the abnormality as a fault. Detection of the fault is simply knowledge that the abnormality exists, while isolation of the fault requires that the cause (or faulty root component of the physical system) be determined for the abnormality.

Failure and Life Prediction

Figure 3:
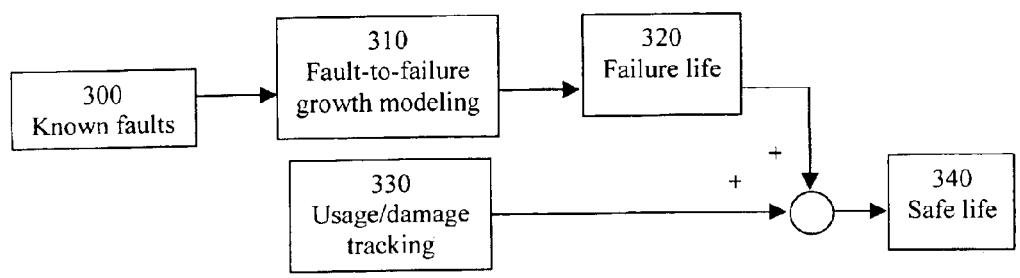
FIG. 3 outlines ICEMS prediction function, according to the present invention.

The third major function of ICEMS is failure prediction or forecast. The purpose of failure prediction is to know the remaining safe and useful, operating lifespan of a component or the entire physical system at any given time. The remaining safe and useful lifespan is usually shorter than the machine's theoretical failure life (i.e., the life when a catastrophic failure is expected to occur or when the machine is expected to break down). Hence, life prediction must consider the actual usage (or damage) of a machine in addition to the predicted failure life. FIG. 3 illustrates ICEMS' prediction function.

Known faults are identified in block 300, the fault-to-failure growth is modeled in block 310, the failure lifespan is calculated in block 320. Separately, equipment/part usage/damage is tracked in block 330. Using the tracked usage/damage and the above calculated failure lifespan calculated in block 320, the safe usage lifespan is calculated in block 340.

Maintenance Decision Support

Planning and scheduling are performed based on the information derived from the previous three functions, i.e., input processing, fault identification, and failure/life prediction. Planning and scheduling are primarily interested in, but not limited to, two sub-functions: maintenance and operations. Maintenance planning and scheduling are concerned with part repair and shop work-scope, while operations planning and scheduling are concerned with mission readiness and asset management.

Preferably, the ICEMS method is implemented in a computer software system consisting of a suite of tools, or modules, that perform the various health management functions. To facilitate information processing and decision making in different industries and for different applications, these tools may differ to suit the needs of a particular industry or equipment; nevertheless, the algorithmic principles behind these tools are similar for similar functions.

Under a general categorization, ICEMS software consists of two types of tools:

Front-end tools (user interface used for selecting desired analytical functions)

Back-end tools (for input processing, analysis, modeling, identification, and prediction and other computations)

The functionality of back-end tools includes, but are not limited to: data analysis; data mining; information fusion; fault identification; failure prediction; life prediction; health assessment, forecasting of inventory demands; prediction of work scope; planning of mission and maintenance operations; and maximization of return on assets.

The advantages of ICEMS over other condition monitoring and health management methods are: a comprehensive health management system; an open platform/system for the health management of a wide range of equipment; advanced algorithms to provide effective analytical functionality.

The ultimate goals of ICEMS are to:

Reduce the downtime (or increased readiness).

Optimize the inventory of spare parts.

Level the work scope.

Reduce the cost of ownership.

Introduction of eICEMS

Figure 4:
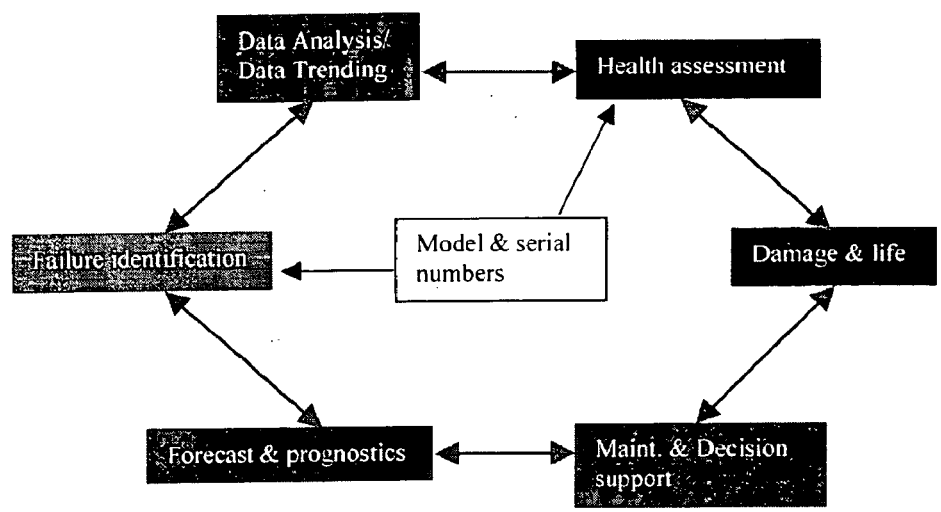
FIG. 4 outlines ICEMS functionality, according to the present invention.

An example of a derivative health management system based on the ICEMS method is the eICEMS, which is a networked computer based software platform for engine/equipment health management. eICEMS implements the major functions of ICEMS with advanced algorithms containing artificial intelligence, statistical, and model-based analysis techniques. eICEMS also incorporates open-system software architecture that supports distributed, tiered application development. eICEMS is an open platform for machinery or equipment condition monitoring and health management. The analytical functions incorporated into eICEMS are: data analysis; fault identification; health assessment; forecast and prognostics; damage estimation and life prediction; maintenance/decision support. These functions are coupled to provide a logical progression of information processing for equipment health management. The relationship of these six functions is shown in FIG. 4. More detailed description, using an engine as an example of the equipment to be monitored and maintained, of these functions are also provided below.

Data Analysis

Equipment or engine Health management deals with data. Data are collected facts. These data can not be used or analyzed further until they are validated and filtered. eICEMS uses advanced signal processing and statistical methods to analyze data. Before the engine data are trended, the user can select the option to validate the input data. After the data are validated, they are smoothed to reveal inherent operating trends. This data trending function can be performed for any selected engine serial number and for any selected flight number (or date of flight).

Figure 5:
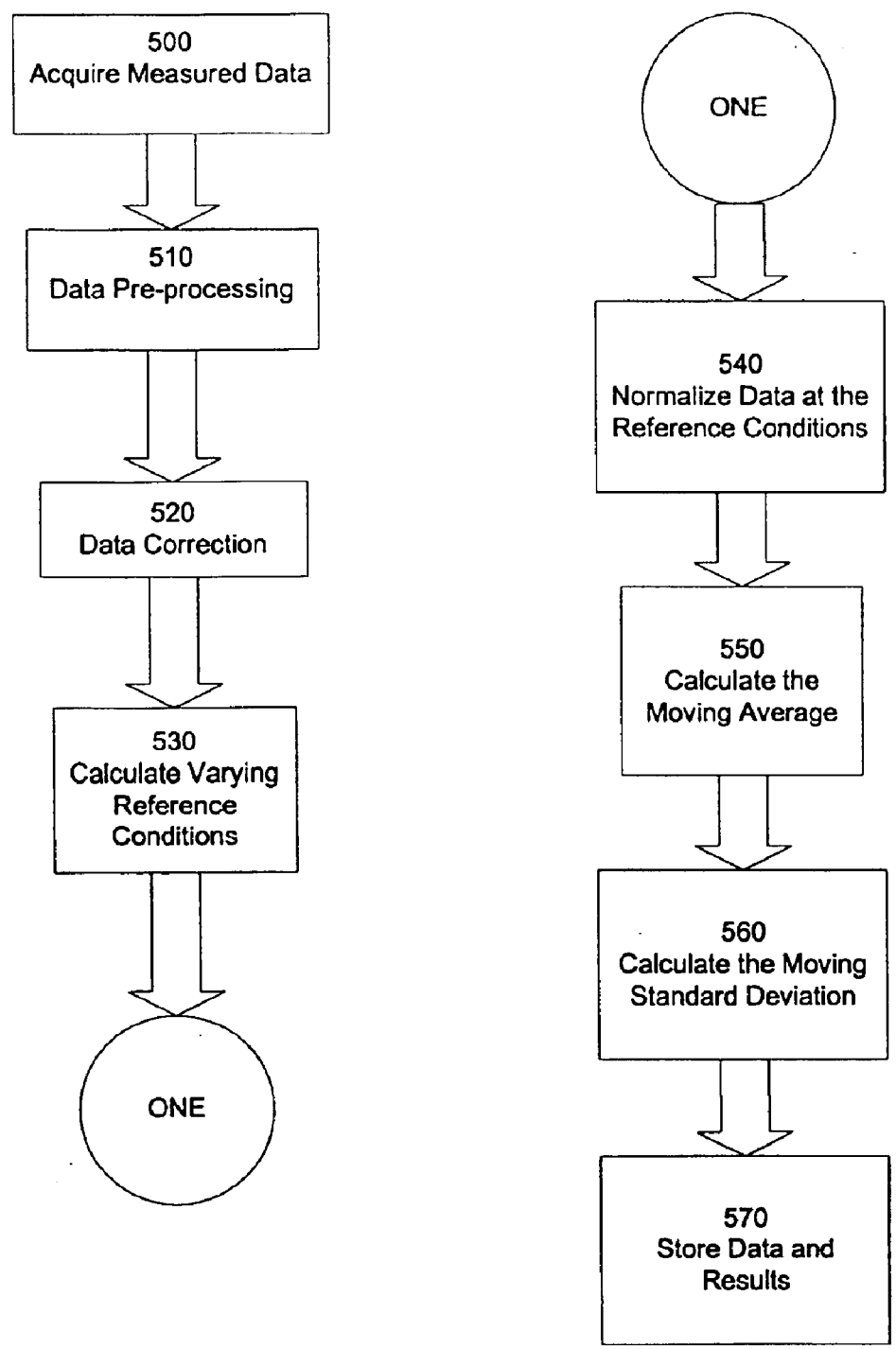
FIG. 5 is a block diagram of a Varying Reference (Operating Condition) Data Trending algorithm according to the present invention.
Figure 6:
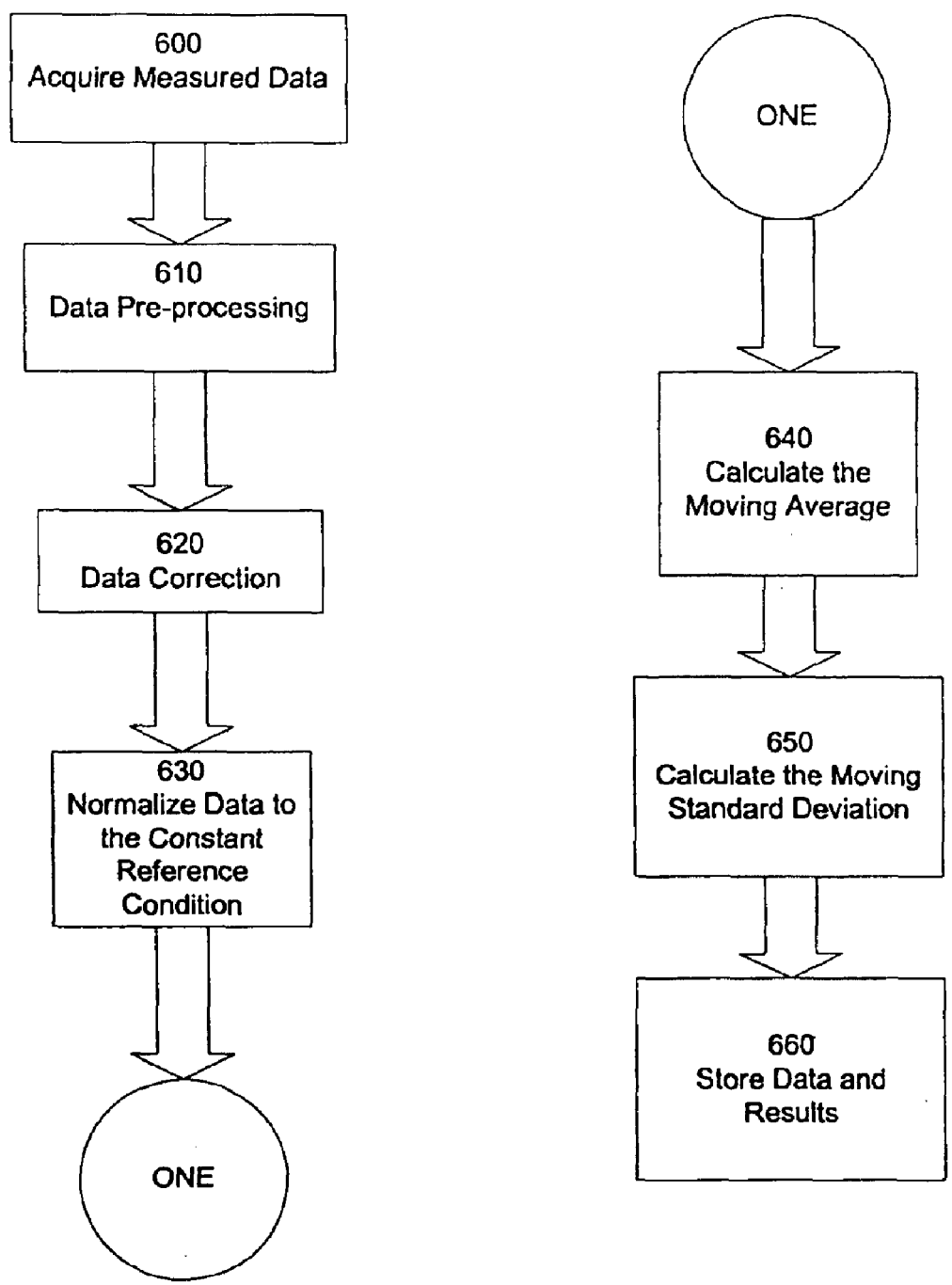
FIG. 6 is a block diagram of Constant Reference (Operating Condition) Data Trending algorithm according to the present invention.

FIGS. 5 and 6 illustrate two preferred algorithms for data smoothing: variable reference data smoothing (FIG. 5); and constant reference data smoothing (FIG. 6).

In the variable reference data smoothing algorithm, measured data are acquired in block 500; the data are pre-processed in block 510, pre-processing may include data transfer, conversion, and reasonableness checks; any data corrections are performed in block 520; a varying reference condition is calculated in block 530; the data are normalized for the calculated varying reference operating condition in block 540; a moving average for the normalized data is calculated in block 550; a moving standard deviation for the normalized data is calculated in block 560; and finally the smoothing data are stored in block 570.

In the constant reference data smoothing algorithm, measured data are acquired in block 600; the data are pre-processed in block 610; any data corrections are performed in block 620; the data are normalized to a constant reference condition in block 630; a moving average for the normalized data is calculated in block 640; a moving standard deviation for the normalized data is calculated in block 650; and finally, the smoothing data and results are stored in block 660.

Failure Identification eICEMS uses information fusion technology to identify potential failures. A hybrid, artificial intelligent algorithm is used to identify possible failure conditions based on the data collected during a flight. Multiple possible failure conditions can be enunciated. An estimated confidence level is associated with each failure condition to help health management personnel or maintenance crews troubleshoot the engine.

Health Assessment

Figure 7:
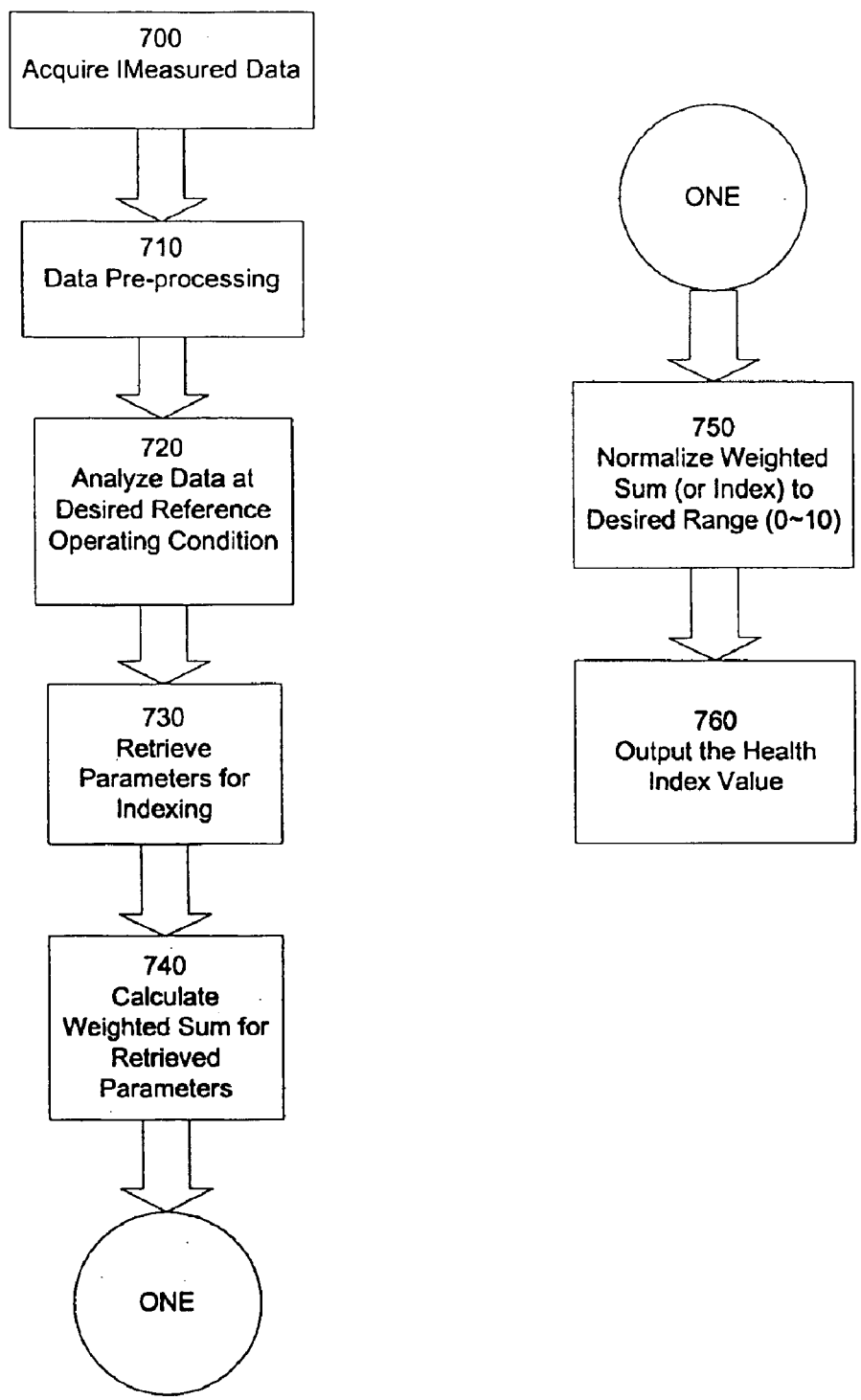
FIG. 7 is a block diagram of a Health Assessment algorithm according to the present invention.

An indexing algorithm calculates a numerical value (between 0 and 10) representing the state of health of a selected engine for each flight (with 10 being the healthiest state). This health index (HI) value is a composite measure of engine health. The idea behind the HI is to give the user a single index to assess the state of health of an engine, instead of trying to conjecture the health from a myriad of diagnostic symptoms. A health assessment algorithm is illustrated in FIG. 7.

In the health assessment algorithm, measured data are acquired in block 700; the data are pre-processed in block 710; the data are analyzed at the desired reference operating condition in block 720; parameters from the analyzed data are retrieved for indexing in block 730; a weighted sum is calculated for the retrieved parameters in block 740; the resultant data are normalized to a desired range, such as 0–10, in block 750; and finally the data are stored and/or output as a health index value in block 760.

Forecast and Prognostics eICEMS uses a forecasting algorithm to estimate the probability of an event happening in the next time window of interest (e.g., 120 days). The events of concern may include: unscheduled removal (or replacement) of part(s), sortie cancellation, or in-flight shutdown, etc. These events are not typically associated with fixed failure modes, whereas failure progression and prediction of future failures are associated with a specific failure mode. eICEMS uses a prognostic algorithm to predict limit excesses in the future. The algorithm allows the user to set thresholds or limits according to specific criteria. Furthermore, eICEMS prognostic function is designed to work with user-supplied failure propagation/prediction models and algorithms due to the strong dependence of domain expertise for prognostics.

Damage/life Estimation

Figure 8:
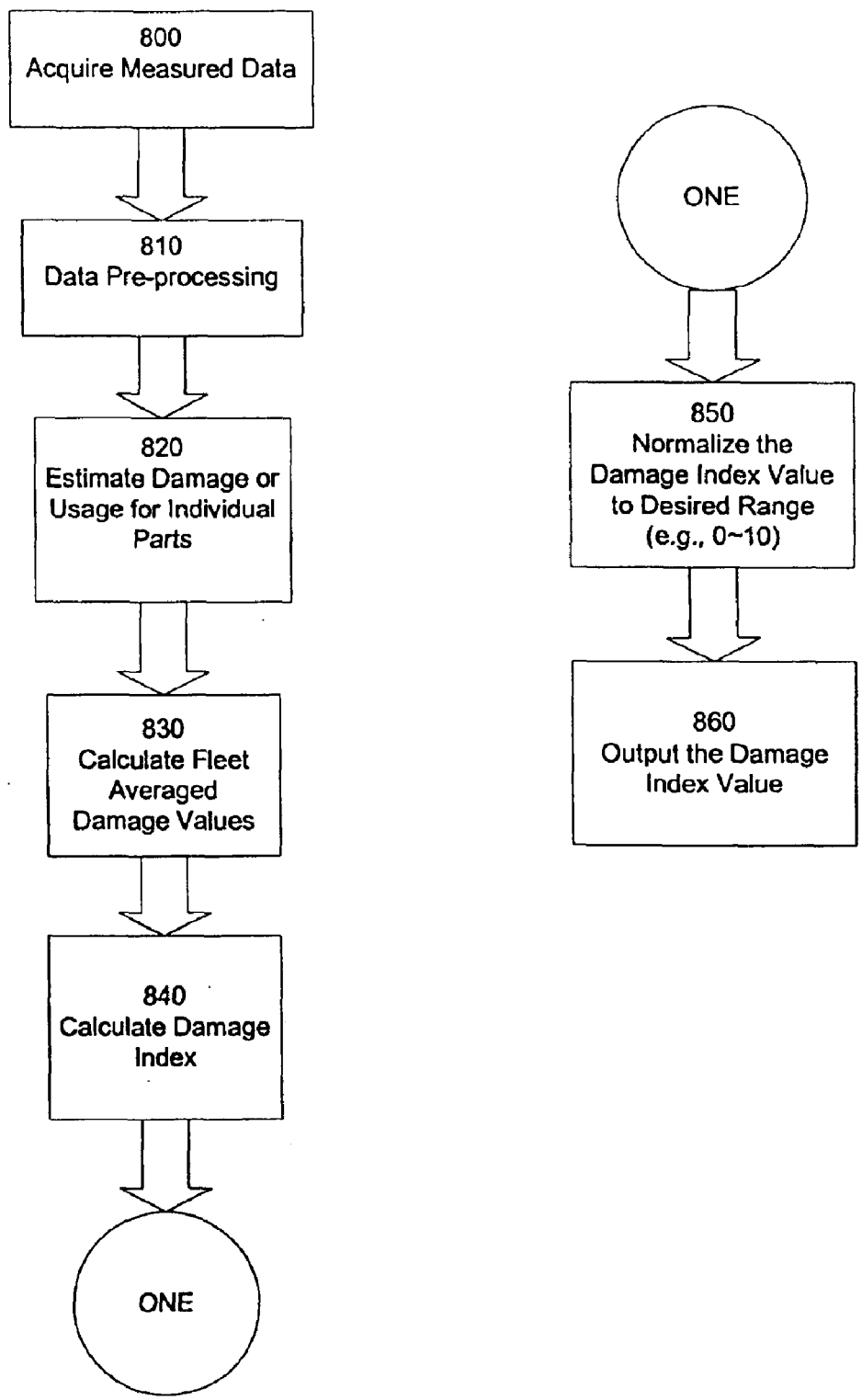
FIG. 8 is a block diagram of a Damage Assessment algorithm according to the present invention.

Damage accumulates as the engine is running. Damage may be caused by several causes, for instance: fatigue, stress rupture, corrosion, etc. Tracking the damage is typically accomplished by continuous recording of damage-dependent variables from the engine. These variables vary from one type of engine (or machine) to another; however, the probabilistic distribution and algorithms used to compute the damage are similar for most engine types (or machines). eICEMS uses a damage estimation algorithm to count and normalize the cumulated damage (between 0 and 10) of the major components of an engine, illustrated in FIG. 8. In addition to hard-time-limited part damage tracking, eICEMS tracks soft-time-limited part damage. This soft-time damage index (DI) reflects the deterioration or scrap of key components. After the DI is calculated, eICEMS life prediction algorithm converts the cumulated damage into an estimated remaining life for a selected component. Damage and remaining life are then presented in a Life-O-Meter.

In the damage estimation algorithm, measured data are acquired in block 800; the data are pre-processed in block 810; damage or usage for individual parts are estimated in block 820; fleet averaged damage values are calculated in block 830; a damage indices are calculated in block 840; the damage index values are normalized to a desired range, such as 0–10, in block 850; and finally the normalized damage index values are stored and/or output in block 860.

Maintenance and Decision Support

Figure 9:
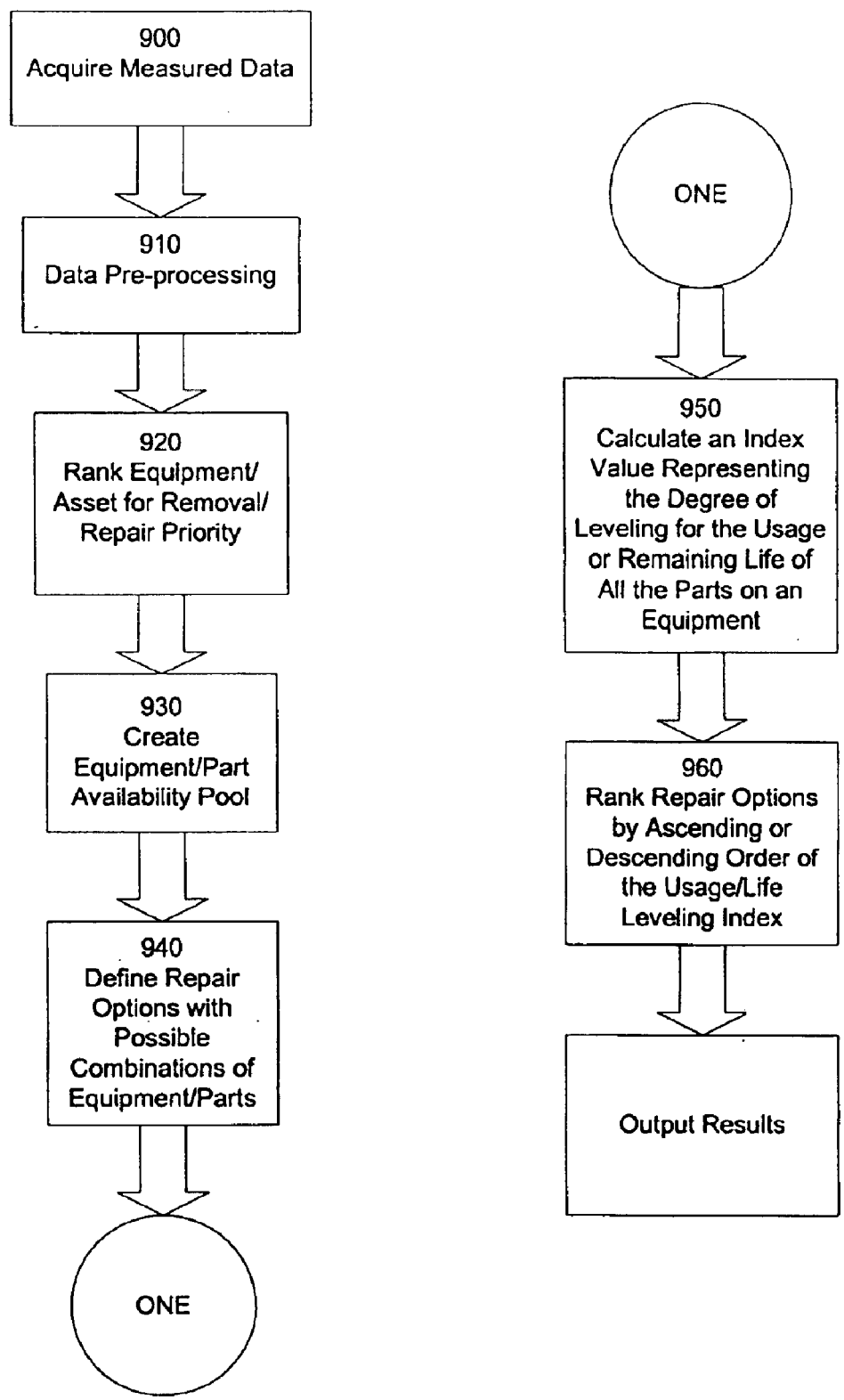
FIG. 9 is a block diagram of an Alignment-Based Equipment Maintenance Planning (AEMP) algorithm according to the present invention.
Figure 10:
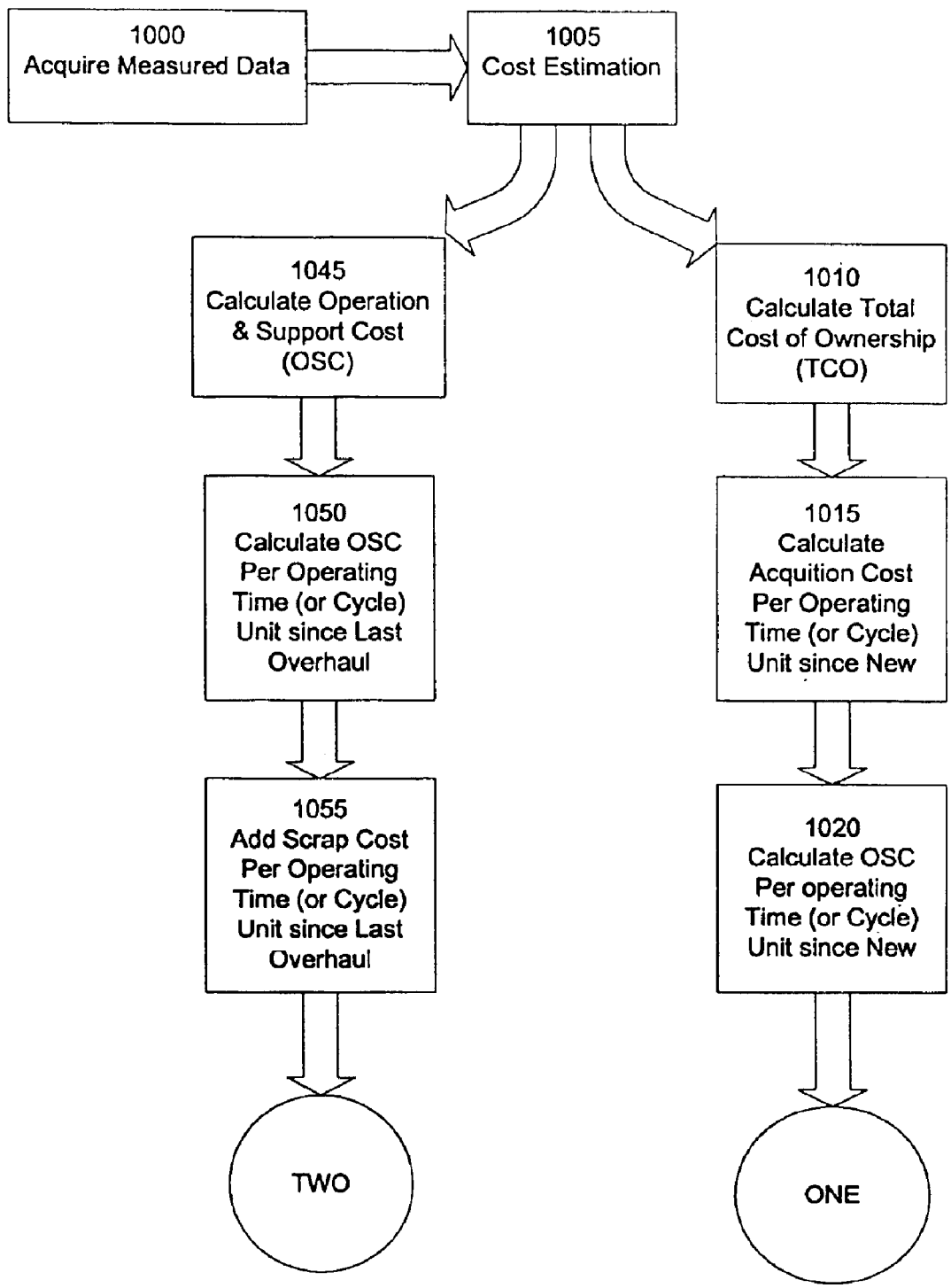
FIG. 10 is a block diagram of a Cost-Based Equipment Maintenance Planning (CEMP) algorithm according to the present invention.

Maintenance and decision support provides two major functions: ranking of engine in the entire fleet and scheduling of engines (or parts) to be removed for a future time window of interest. Different criteria for ranking can be selected by the user. Similarly, different optimization policies for engine removal can be selected by the user. eICEMS engine removal planning algorithms implement two removal philosophies: usage leveling (Alignment-Based Equipment Maintenance Planning or AEMP; illustrated in FIG. 9) and cost optimization (Cost-Based Equipment Maintenance Planing or CEMP; illustrated in FIG. 10). These sophisticated algorithms recommend and update the optimal engine removal schedule for the entire fleet. eICEMS work scope planning algorithm helps maintenance operation to streamline inventory control and shop resource leveling.

In the Alignment-Based Equipment Maintenance Planning algorithm, measured are acquired in block 900; the data are pre-processed in block 910; the equipment/asset, based upon the pre-processed data, are ranked for removal/repair priority in block 920; an engine/part availability pool is created based upon the above removal/repair ranking in block 930; repair options, with possible combinations of equipment/parts, are defined in block 940; an index value representing the degree of leveling for the usage or remaining life of all the parts on an equipment are calculated in block 950; repair options are ranked by ascending or descending order of the usage/life leveling index in block 960; and finally, the results are output in block 970.

In the Alignment-Based Equipment Maintenance Planning algorithm, measured data are acquired in block 1000; a cost estimation is calculated in block 1005. If the engine is new, the total cost of ownership is calculated in block 1010; the acquisition cost per operating time (or cycle), since new, is calculated in block 1015; the operation support cost per operating time (or cycle), since new, is calculated in block 1020; the scrap cost per operating time (or cycle), since new, is calculated in block 1025; the maintenance cost per operating time (or cycle), since new, is calculated in block 1030; the risk cost per operating time (or cycle), since new, is calculated in block 1035; and finally all costs per operating time (or cycle), since new, are summed up on block 1040. If the engine is used, after the cost estimation is calculated in block 1005, the operational support cost is calculated in block 1045; the support cost per operating time (or cycle), since last overhaul, is calculated in block 1050; the scrap cost per operating time (or cycle), since last overhaul, is added in block 1055; the maintenance cost per operating time (or cycle), since last overhaul, is added in block 1060; the risk cost per operating time (or cycle), since last overhaul, is calculated in block 1065; and finally, all costs per operating time (or cycle), since last overhaul, is summed in block 1070.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A comprehensive condition monitoring and maintenance management system comprising the steps of:

a) acquiring measured data relating to at least one part or piece of equipment;

b) either identifying any faults present in the at least one part or piece of equipment using the acquired data; or c) identifying any potential failures, or useful lifespan, of the at least one part or piece of equipment using the acquired data; and d) planning and scheduling maintenance decisions or actions using any faults identified above, any failures predicted above, the lifespan predicted above, and cost of ownership considerations for the at least one part or piece of equipment, wherein the cost of ownership considerations uses if the engine is new, a calculated total cost of ownership; a calculated acquisition cost per operating time (or cycle), since new; a calculated the operation support cost per operating time (or cycle), since new; a calculated scrap cost per operating time (or cycle), since new; the maintenance cost per operating time (or cycle), since new; a calculated risk cost per operating time (or cycle), since new; and finally a summed all costs per operating time (or cycle), since new; however if the engine is used, after the cost estimation is calculated, the operational support cost is calculated; the support cost per operating time (or cycle), since last overhaul, is calculated; the scrap cost per operating time (or cycle), since last overhaul; the maintenance cost per operating time (or cycle), since last overhaul, is calculated; the risk cost per operating time (or cycle), since last overhaul, is calculated; and finally, all costs per operating time (or cycle), since last overhaul are summed.

2. The system of claim 1 wherein the step of acquiring measure data further includes the step of filtering and smoothing the acquired data after acquisition.

3. The system of claim 1 wherein the step of fault identification further includes the step of identifying an abnormality in the acquired data and monitoring the abnormality until such time as the abnormality reaches a predetermined threshold that defines a fault condition and finally signaling that a fault condition has occurred.

4. The system of claim 1 wherein the step of identifying a potential failure, or useful lifespan, of the at least one part or piece of equipment further includes the steps of:

a) identifying known faults in the at least one part or piece of equipment;

b) modeling the fault to failure growth for the known faults;

c) calculating the failure lifespan for the at least one part or piece of equipment;

d) tracking the usage/damage of the at least one part or piece of equipment; and e) calculating the safe usage lifespan using the failure lifespan and the tracked usage/damage of the at least one part or piece of equipment.

* * * * *